United States Patent [19]
Bienert et al.

[11] Patent Number: 5,647,680
[45] Date of Patent: Jul. 15, 1997

[54] WIPER ARM

[75] Inventors: Herbert Bienert, Besigheim; Bruno Egner-Walter, Heilbronn; Andreas Fink, Großbottwar, all of Germany

[73] Assignee: ITT Automotive Europe GmbH, Germany

[21] Appl. No.: 749,866

[22] Filed: Nov. 15, 1996

Related U.S. Application Data

[63] Continuation of Ser. No. 403,811, Mar. 16, 1995, abandoned.

[30] Foreign Application Priority Data

Sep. 16, 1992 [DE] Germany ............ 42 30 961.1

[51] Int. Cl.⁶ .................................................. B60S 1/34
[52] U.S. Cl. ........................ 403/263; 403/258; 403/261; 15/250.34; 15/250.352
[58] Field of Search ........................ 403/258, 261, 403/263, 256, 253, 247; 15/256.34, 256.351, 250.352

[56] References Cited

U.S. PATENT DOCUMENTS

| | | | |
|---|---|---|---|
| 2,193,724 | 3/1940 | Horton | 15/250.34 X |
| 4,472,854 | 9/1984 | Bauer et al. | 15/250.351 X |
| 4,781,429 | 11/1988 | Cartier . | |
| 5,233,720 | 8/1993 | Schon | 15/250.34 X |

FOREIGN PATENT DOCUMENTS

| | | |
|---|---|---|
| 2184348 | 12/1973 | France . |
| 2550110 | 2/1985 | France . |
| 2563482 | 10/1985 | France . |
| 3428795 | 2/1985 | Germany . |
| 3624270 | 3/1988 | Germany . |
| 3926714 | 2/1991 | Germany . |
| 1180177 | 2/1970 | United Kingdom . |
| 2117630 | 10/1983 | United Kingdom . |
| WO94/06654 | 3/1994 | WIPO . |

OTHER PUBLICATIONS

International Search Report for Application PCT/EP93/02392 filed 04/Sep./1993.

Primary Examiner—Anthony Knight
Attorney, Agent, or Firm—J. Gordon Lewis; Thomas N. Twomey

[57] ABSTRACT

A wiper arm for cleaning the windscreen of an automotive vehicle. The wiper arm includes a fastening component which is provided with a receptacle for a wiper shaft, which receptacle is integrally molded to a sheet metal component forming a back and is flanked by side walls connected with the back. The receptacle, back and side walls are integrally molded in one piece to the fastening component, a flat construction and, simultaneously, a capacity for transmitting high torques are achieved in that the edges of the deep-drawn fastening component or rather the edges of the receptacle and of the side walls point towards the windscreen of the vehicle.

7 Claims, 1 Drawing Sheet

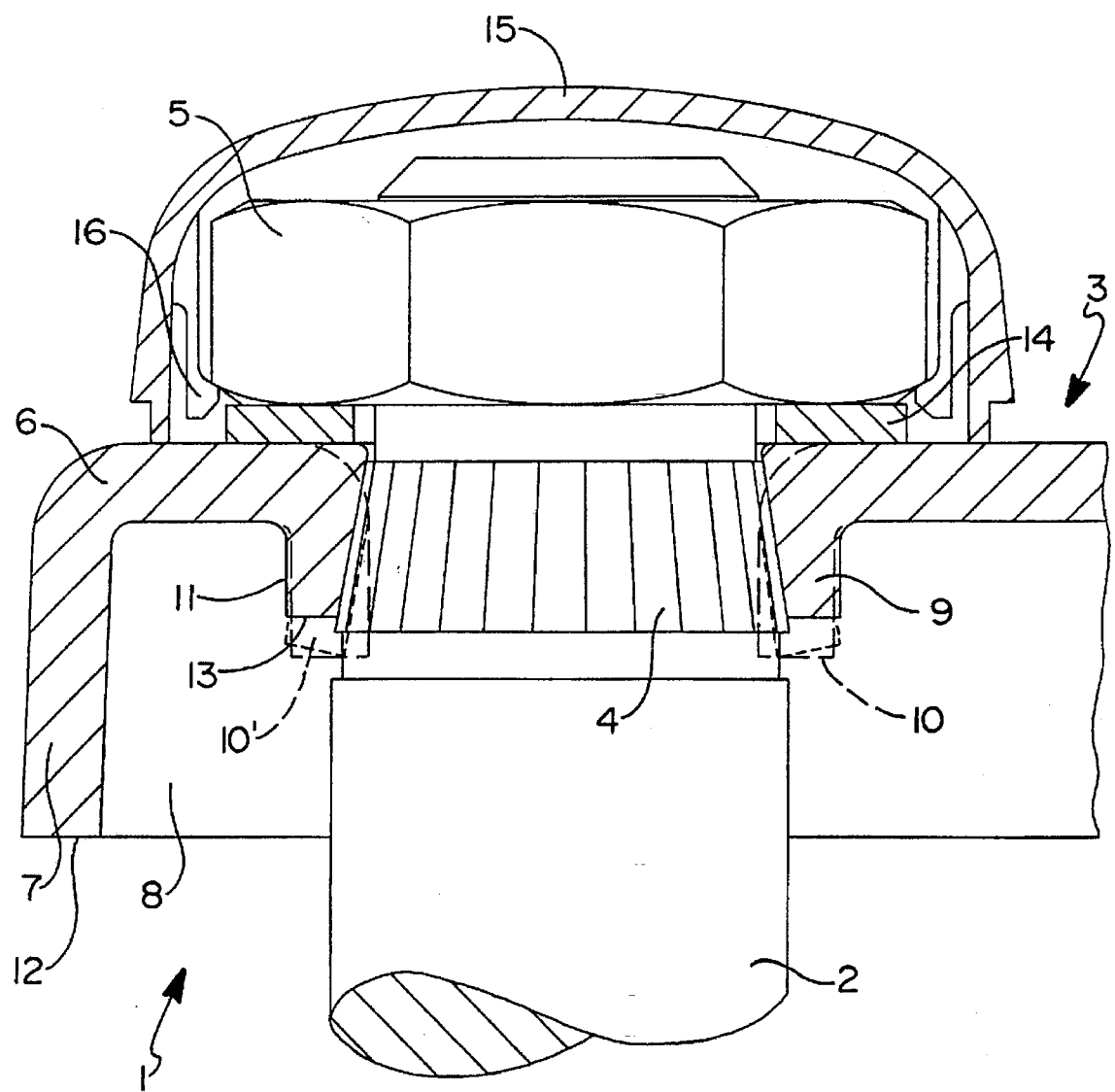

WIPER ARM

This application is a continuation of application Ser. No. 08/403,811, filed as PCT/EP93/02392 on Sep. 4, 1993 now abandoned.

TECHNICAL FIELD

This invention relates to wiper arms, and more particularly two wiper arms that have a fastening component which is provided with a receptacle for a wiper shaft, which receptacle is integrally molded to a sheet metal component forming a back and is flanked by side walls connected with the back.

BACKGROUND OF THE INVENTION

From DE 39 26 714 A1 a wiper arm is known which has a fastening component formed by a deep-drawn sheet metal part. This sheet metal part is punched out of a sheet metal strip and is bent into the desired shape in a deep-drawing die. Essentially, the fastening component consists of two elements, namely of a receptacle for the accommodation of the wiper shaft and of a sheet metal lining which surrounds the receptacle. Admittedly, the receptacle and the sheet metal lining are manufactured from one sole piece of sheet metal strip. However, the receptacle is not directly connected with the back of the sheet metal lining, which back abuts the receptacle. Rather, the receptacle only rests loosely against this back. It has been found out that a one-piece combination of the back and of the receptacle permits the transmission of greater forces and torques so that there is relatively low risk that the fastening component will deform in case of a jammed wiper arm.

From DE 34 28 795 A1 and from FR 2 550 110 B1 a fastening component has come to knowledge which is likewise manufactured by way of deep drawing. In this fastening component, the receptacle for the wiper shaft is formed in one piece with the back so that it is possible to transmit higher torques with such a fastening component. However, this fastening component requires a special cap which, after screwing of the fastening component to the wiper shaft, overlaps and covers the wiper shaft end and the fastening nut. Thus, a separate component must be provided for this covering, which component has to be mounted elastically or movably to the fastening component.

Proceeding from DE 34 28 795 A1, it is an object of this invention to provide a wiper arm by means of which high torques are transmitted and where no additional covering component is required.

According to this invention, this object is solved in that the edges of the deep-drawn fastening component or rather the edges of the receptacle and of the side walls point towards the windscreen of the vehicle.

Due to this design of the fastening component, an essentially U-shaped form is provided which is open towards the windscreen of the vehicle. The advantage of this design is that all the edges of the fastening component point toward the vehicle, and accordingly reducing the risk of injuries. Further, no cap is needed which has to lock the fastening component with respect to the outside, after it has been mounted on the wiper shaft, in order to avoid any danger of injuries caused by the edges. The fastening component embracing the wiper shaft is held by a nut which rests on the back of the fastening component. This nut can be covered, e.g., by a plastic plug placed onto the nut. However, it is also conceivable to design the nut as a cap nut so that no nut-covering plastic component is needed. By means of the edges pointing towards the windscreen of the vehicle it is possible to design the fastening component so that the fastening component extends directly as far as the surface of the car body. Further, the inventive design of the fastening component allows an extremely flat construction which enables further possibilities design and optimum aerodynamic qualities to be achieved.

In a further development, it is provided that the back passes over in a level way from the side walls into the receptacle. The advantage of this design is that the nut which fixes the fastening component on the end of the wiper shaft can rest with its entire surface on the back, which will ensure a secure hold and will prevent any unintended, loosening. It is also possible to insert sealing washers and/or spring rings between the fastening nut and the back. Self-locking nuts are used with preference.

In one example of an embodiment the wall thickness of the receptacle will diminish towards the edge. In this way it is possible to adapt the fastening component to specific shapes of shaft ends in response to any customer wishes. In particular, it is possible to make allowance for specific strength specifications. To this end, the receptacle may have a cylindrical design or the receptacle may have the shape of a frustrum of a cone. Depending on the design of the end of the wiper shaft, the receptacle is provided with a matching shape so as to be connected positively with the wiper shaft end. An optimum adaptation of the receptacle to the end of the wiper shaft will be achieved in that the wall of the receptacles is elastically ductile. Because of the tightening of the nut on the end of the wiper shaft, the fastening component, e.g., is pressed onto the knurled surface of the frustrum of the cone of the wiper shaft so that a positive and frictional connection will be established between the fastening component and the wiper shaft.

In a further development it is provided that the side walls extend beyond the receptacle towards the windscreen of the vehicle or rather along the direction of the wiper shaft. Due to the side walls, the fastening component can end almost flush with the surface of the car body so that there will only be a small gap between the surface of the car body and the lower edge of the fastening component. With regard to wiper arms arranged below the engine hood it is possible in this way to achieve an extremely flat construction. Thus, the gap which exists between the windscreen-side end of the engine hood and the windscreen itself and through which the wiper arm is guided outwards can be dimensioned relatively narrow.

The outward-pointing surface of the back is designed so as to serve as abutment surface for the fastening means such as a fastening nut which fixes the fastening component on the wiper shaft. In such a design the abutment surface may be smooth or corrugated like a spring ring. This will have an arresting effect against any inadvertent loosening of the fastening nut. In this case, no further components will be required for securing the fastening nut so that the construction may be even flatter. Moreover, a particularly level contact will ensure that, without any additional components, the upper end of the receptacle will be tightly sealed against any penetration of humidity and dirt.

A frictional connection of the fastening component and of the wiper shaft can be achieved in an easy way in that the surface of the receptacle which faces the wiper shaft has a superficial structure. If a fastening component with a receptacle of such a design is placed on a hurled end of a wiper shaft and fixed by means of a nut than the hurled surface can embed its way into the superficial structure of the inner surface of the receptacle. In this way a positive connection will be achieved.

BRIEF DESCRIPTION OF THE DRAWING

FIG. 1 is a longitudinal section through a fastening component mounted onto a wiper shaft.

DETAILED DESCRIPTION OF THE PREFERRED EMBODIMENT

Numeral 1 designates the end of a fastening component 3 or wiper arm, which end 1 faces a wiper shaft 2. This end 1 is placed onto a knurled cone 4 of the wiper shaft 2 and is secured by means of a nut 5 against any unintended and untimely loosening. The end 1 of wiper arm 3 has a back 6, side walls 7 and 8 and a receptacle 9. The back 6, the side walls 7 and 8 and the receptacle 9 are molded or formed by deep drawing the wiper arm 3 from a piece of sheet metal. In this operation the piece of sheet metal is first pre-punched by means of a small-diameter punch and, subsequently, the receptacle 9 is deep-drawn downwards. Thereupon, the receptacle 9 is widened to form a cone with an angle of a cone of 15° to 20°, in particular of 18° 55', and the neck 10 thus formed is upset, with the material being pressed to the apex of the cone. Thereby, a particularly stable bond is achieved between the back 6 and the receptacle 9. The outer surface 11 of the receptacle 9 of this design may be cylindrical. In the drawing, this manufacturing operation is represented by broken lines. The first step of such an operation, the downward deep drawing of the cylindrical neck 10, is represented by a dash-type broken line while the neck 10', widened to form a cone, is represented by a broken line of the dotted type.

In the drawing, it is moreover clearly discernible that the edges 12 and 13 of the side walls 7 and 8 as well as of the receptacle 9 point along the direction of the wiper shaft 2 or rather in the direction of respectively a non-illustrated windscreen and body surface of an automotive vehicle. In this way it is possible to cover the upper end of the wiper shaft 2 by means of the side walls 7 and 8 so that the fastening component 3 ends directly above the surface of the car body. The advantage of this design of the fastening component 3 is that it can be constructed in an extremely flat version. A further advantage of the level design of the back 6 is that instead of, e.g., a spring ring 14 or of a sealing ring the nut 5 may rest on the level outer surface and that the fastening component 3 can be pressed onto the hurled cone of the wiper shaft 2 without resorting to any additional components. An optimum frictional and positive connection can be brought about in that the angle of the cone of the receptacle 9 is slightly smaller than that of the hurled cone 4 of the wiper shaft 2 so that the receptacle 9 will be widened slightly when the nut 5 is tightened. Besides, the inner surface of the receptacle 9 which rests against the cone 4 can be structured so that the hurled surface will embed its way into the structured surface of the receptacle 9.

As illustrated in the drawing, the nut 5 can be the simple type. However, a cap nut can also be used. Referring to the representation of the nut 5 in the drawing, it is possible to snap a cap 15 over the nut 5 after tightening, which cap 15 can be firmly anchored by way of detents 16 engaging the nut 5 from below.

We claim:

1. A wiper arm assembly for use in cleaning a windscreen or an automotive vehicle, the assembly comprising:

a wiper shaft having a conical portion with a first included angle tapering toward an end of the shaft;

a fastening component formed of sheet metal pressed onto the conical portion and having a back flanked by sidewalls extending therefrom and having a receptacle with a neck extending from the back with the neck receiving the conical portion of the wiper shaft wherein the receptacle and the sidewalls are integrally formed in one piece with the back and wherein the edges of the receptacle and of the sidewalls point away from a back of the arm with the neck having a first length and the neck also having an internal conical shape of a second included angle smaller than the first included angle before the fastening component is pressed onto the wiper shaft and with the neck conforming to the first included angle of the conical portion of the shaft and the neck portion being shorter than the first length with material from the neck portion being displaced toward the back after the fastening component is pressed onto the wiper shaft.

2. A wiper arm as claimed in claim 1 wherein the back is level between the receptacle and the sidewalls.

3. A wiper arm as claimed in claim 1 wherein the wall thickness of the receptacle diminishes toward the edge.

4. A wiper arm as claimed in claim 1 wherein the receptacle has a cylindrical shape before it is pushed onto the wiper shaft.

5. A wiper arm as claimed in claim 1 wherein the receptacle has the shape of a frustum of a cone before it is pushed onto the wiper shaft.

6. A wiper arm as claimed in claim 1 wherein the side walls extend beyond the receptacle toward the windscreen of the vehicle.

7. A wiper arm as claimed in claim 1 wherein the shaft has a threaded end adjacent a small diameter end of the conical portion and having a nut threaded over the threaded wherein an axial load pressing the fastening onto the knurled conical portion is generated by rotating the nut on the threads.

* * * * *

UNITED STATES PATENT AND TRADEMARK OFFICE
CERTIFICATE OF CORRECTION

PATENT NO. : 5,647,680
DATED : Jul. 15, 1997
INVENTOR(S) : Bienert et al.

It is certified that error appears in the above-indentified patent and that said Letters Patent is hereby corrected as shown below:

Column 4, line 45, change "wails" to --walls--.

Signed and Sealed this

Twenty-third Day of September, 1997

Attest:

BRUCE LEHMAN

Attesting Officer

Commissioner of Patents and Trademarks